US012017872B2

(12) United States Patent
Bardi

(10) Patent No.: US 12,017,872 B2
(45) Date of Patent: Jun. 25, 2024

(54) LOADING/UNLOADING ASSEMBLY AND SYSTEM FOR FLAT CERAMIC PRODUCTS AND METHOD TO TRANSPORT FLAT CERAMIC PRODUCT

(71) Applicant: SACMI TECH S.P.A., Imola (IT)

(72) Inventor: Maurizio Bardi, Formigine (IT)

(73) Assignee: SACMI TECH S.P.A., Imola (IT)

( * ) Notice: Subject to any disclaimer, the term of this patent is extended or adjusted under 35 U.S.C. 154(b) by 0 days.

(21) Appl. No.: 18/000,203

(22) PCT Filed: May 28, 2021

(86) PCT No.: PCT/IB2021/054703
§ 371 (c)(1),
(2) Date: Nov. 29, 2022

(87) PCT Pub. No.: WO2021/240464
PCT Pub. Date: Dec. 2, 2021

(65) Prior Publication Data
US 2023/0202776 A1 Jun. 29, 2023

(30) Foreign Application Priority Data
May 29, 2020 (IT) .......................... 102020000012841

(51) Int. Cl.
B65G 49/06 (2006.01)
B65G 61/00 (2006.01)
B65G 65/00 (2006.01)

(52) U.S. Cl.
CPC ............. *B65G 49/06* (2013.01); *B65G 61/00* (2013.01); *B65G 65/00* (2013.01)

(58) Field of Classification Search
CPC .. B65G 2201/022; B65G 49/06; B65G 57/00; B65G 61/00; B65G 65/00; B65G 57/14;
(Continued)

(56) References Cited

U.S. PATENT DOCUMENTS 3,533,517 A * 10/1970 Heide ..................... B65G 37/00
414/790
3,643,816 A * 2/1972 Jacobsen ................ B65H 33/16
414/788.9
(Continued)

FOREIGN PATENT DOCUMENTS

CN 109693903 4/2019
CN 109693945 A * 4/2019 ............. B65G 43/00
(Continued)

OTHER PUBLICATIONS

International Preliminary Report on Patentability received for PCT Patent Application No. PCT/IB21/054703, dated Dec. 8, 2022, 11 pages.
(Continued)

*Primary Examiner* — Gregory W Adams
(74) *Attorney, Agent, or Firm* — Workman Nydegger

(57) ABSTRACT

A loading/unloading assembly of flat ceramic products comprising: a conveying unit for conveying a plurality of flat ceramic products; at least one loading/unloading device for flat ceramic products for receiving a support structure so that it rests on it and at least one pick-up device for picking up and transferring at least one flat ceramic product from the conveying unit to the support structure, and/or vice versa; the loading/unloading device comprises at least one bearing device for bearing at least said support structure and a plurality of flat ceramic products stacked on top of one another, and a moving device for moving said support structure, between a first position at a first height from said bottom, and at least a second position at a second height from said bottom, the second height is greater than the first height.

8 Claims, 11 Drawing Sheets

(58) Field of Classification Search
CPC .... B65G 57/035; B65G 57/04; B65G 59/045; B65G 59/026; B65G 59/00; B65H 33/16; B65H 31/32; B65H 2404/3111; B65H 31/28; B65H 2301/42256; B65B 35/44; B21D 43/24
USPC ........... 198/620, 801, 468.8, 817; 414/795.8, 414/790.4, 789.9, 794.7, 927, 928, 929, 414/793, 797
See application file for complete search history.

(56) References Cited

U.S. PATENT DOCUMENTS

| | | | | |
|---|---|---|---|---|
| 3,723,227 | A * | 3/1973 | Oono | B27D 1/04 |
| | | | | 156/557 |
| 3,907,274 | A * | 9/1975 | D'Amato | B65H 29/045 |
| | | | | 101/232 |
| 4,480,953 | A | 11/1984 | Baba | |
| 6,086,322 | A * | 7/2000 | Prokopp | H05K 13/08 |
| | | | | 414/795.8 |
| 6,957,943 | B2 * | 10/2005 | Hahn | B65H 31/24 |
| | | | | 414/929 |
| 7,469,896 | B2 * | 12/2008 | Sato | B65H 39/10 |
| | | | | 271/298 |
| 7,748,514 | B2 * | 7/2010 | Shimizu | B65G 47/46 |
| | | | | 198/346.1 |
| 9,221,628 | B2 * | 12/2015 | Dax | B65H 33/16 |
| 2019/0062074 | A1 * | 2/2019 | Johnson | B65B 5/105 |
| 2020/0016706 | A1 * | 1/2020 | Thorwarth | B23P 21/004 |

FOREIGN PATENT DOCUMENTS

| | | | | |
|---|---|---|---|---|
| DE | 4414001 | | 8/2002 | |
| EP | 0377400 | | 7/1990 | |
| EP | 0436507 | | 7/1991 | |
| EP | 1231170 | | 8/2002 | |
| KR | 20170024709 | A * | 3/2017 | ............. B29C 33/44 |
| WO | WO-2018172336 | A1 * | 9/2018 | ............. B23P 21/00 |

OTHER PUBLICATIONS

International Search Report and Written Opinion received for PCT Patent Application No. PCT/IB21/054703, dated Oct. 4, 2021, 14 pages.
International Search Report and Written Opinion for PCT/IB2021-054703 dated Oct. 4, 2021.

* cited by examiner

LOADING/UNLOADING ASSEMBLY AND SYSTEM FOR FLAT CERAMIC PRODUCTS AND METHOD TO TRANSPORT FLAT CERAMIC PRODUCT

CROSS-REFERENCE TO RELATED APPLICATIONS

This patent application is a 35 U.S.C. § 371 US National Stage of PCT/IB2021/054703, filed on May 28, 2021, and which claims priority from Italian patent application no. 102020000012841 filed on May 29, 2020. The entire disclosure of each of the aforementioned applications is incorporated herein by reference.

TECHNICAL FIELD

The present invention relates to a loading/unloading assembly and system for flat ceramic products and to a method to transport flat ceramic products.

BACKGROUND OF THE INVENTION

The known processing systems for flat ceramic products generally have a loading/unloading assembly for flat ceramic products so as to transfer (i.e. load or unload) a plurality of flat ceramic products, generally organized in groups (commonly called "square panels"), between a support structure designed to support a plurality of flat ceramic products (or groups of flat ceramic products) stacked on top of one another (typically a plank, or a pallet, or a euro pallet) and a conveying unit adapted to convey such flat ceramic products entering or leaving a processing machine, for example from a warehouse or from a pallet loading machine or from a palletizing machine or from a sanding machine, etc.

In particular, a known loading/unloading assembly for flat ceramic products comprises: a conveying unit, a loading/unloading device configured to receive and support a support structure, and a pick-up device for picking up a flat ceramic product (or a group of flat ceramic products), and transferring it from the conveying unit to the loading/unloading device, or vice versa. Typically, a loading/unloading assembly provides for two loading/unloading devices, each configured to transfer (load or unload) the flat ceramic products between a support structure and the conveying unit so that, once the loading or unloading of the support structure arranged in one of the loading/unloading devices has been completed, the unloading or loading operations of the processing machine can continue on the support structure arranged in the area of the other loading/unloading device.

Indeed, once the loading or unloading of flat ceramic products from or to a support structure has been completed (i.e., once the maximum containment capacity of the support structure has been reached, or once the support structure has been emptied), such loaded or unloaded support structure must be replaced with another unloaded or loaded support structure, such replacement operation requires a certain time, during which it would be disadvantageous to interrupt the feeding of flat ceramic products to the machine, or the exit of flat ceramic products from the machine.

In particular, the replacement of a (loaded or unloaded) support structure provides for picking up the support structure to be replaced, transferring it, for example, to a storage area or to a sending area, and immediately after picking up a new (loaded or unloaded) support structure and transferring it to the loading/unloading device.

These operations can be carried out either by means of a traditional manually-driven transport vehicle driven by an operator or, when the system is provided with an automatic navigation and management system, by means of one or more automatically-driven transport vehicles, for example one or more LGVs (Laser Guided Vehicles), capable of moving autonomously within a loading/unloading system, in particular within a work area of the loading/unloading system.

In both cases, the replacement operations of a (loaded or unloaded) support structure require a certain time which varies based on the spaciousness of the work area, on the distribution of the storage areas, on the number of automatically-driven transport vehicles or the number of operators and manually-driven transport vehicles, etc.

It follows that, when the number of automatically-driven or manually-driven transport vehicles (and/or the number of operators driving them) is not sufficient, and/or the transfer of the support structures is subjected to slowdowns due to reduced spaces and/or obstacles in the work area, the replacement operations risk requiring an excessive amount of time, in particular longer than the time necessary to complete a loading or unloading step. In other words, it can happen that the time necessary to replace a support structure arranged in the area of the loading/unloading devices is greater than the time necessary to complete the loading and unloading of the other support structure, arranged in the area of the other loading/unloading device.

This entails a stoppage of the system and consequent slowdowns in production and/or unacceptable bottlenecks in the field of the processing of flat ceramic products.

In order to try to solve such problem, the number of automatically-driven or manually-driven transport vehicles (and in this case also the number of operators) that serve each loading/unloading system should be increased, and/or the extension of the work spaces should be increased so as to allow faster movements of the automatically-driven or manually-driven transport vehicles within the work area. This, besides not being always possible, for example due to physical limitations (in particular in terms of available space) of the systems, would entail a considerable increase in the costs of the system and of the manufacturing process of the flat ceramic products.

The following prior art documents are noted: document EP1231170A1, which describes an automatic apparatus of a packaging machine configured to palletize full or empty cardboard cases; document DE4414001A1, which describes a palletizing machine for loading or unloading pallets; document U.S. Pat. No. 4,480,953A, which describes an apparatus for palletizing panels of various shapes and sizes coming out of a pressing machine; document EP0436507A1, which describes a method and an apparatus for the horizontal and vertical handling of pallets; and document CN109693903A, which describes an automatic goods loading and unloading system.

The object of the present invention is to provide a loading/unloading assembly and system for flat ceramic products and a method for transporting flat ceramic products, which allow overcoming, at least partially, the drawbacks of the prior art and are, at the same time, easy and cost-effective to manufacture.

SUMMARY

In accordance with the present invention, a loading/unloading assembly and system for flat ceramic products and a method for transporting flat ceramic products are proposed, according to what disclosed in the appended independent claims, and preferably, in any one of the claims directly or indirectly depending on the mentioned independent claims.

The claims describe preferred embodiments of the present invention forming integral part of the present description.

BRIEF DESCRIPTION OF THE DRAWINGS

The invention is described in the following with reference to the accompanying drawings, which illustrate some non-limiting embodiment examples thereof, wherein.

DETAILED DESCRIPTION

Figure 1:
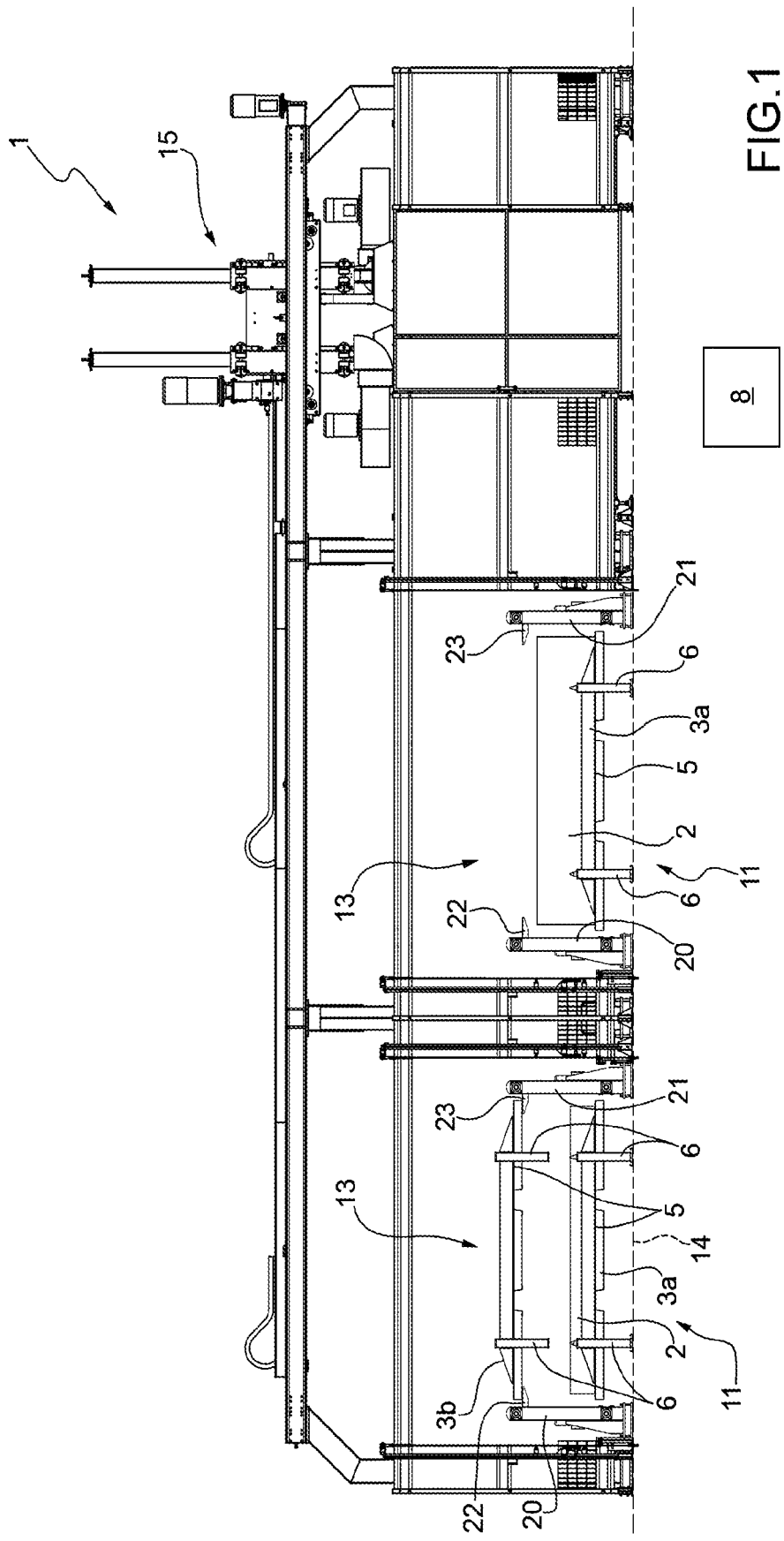
FIG. 1 illustrates a side view of a part of the loading/unloading system of the present invention.
Figure 2:
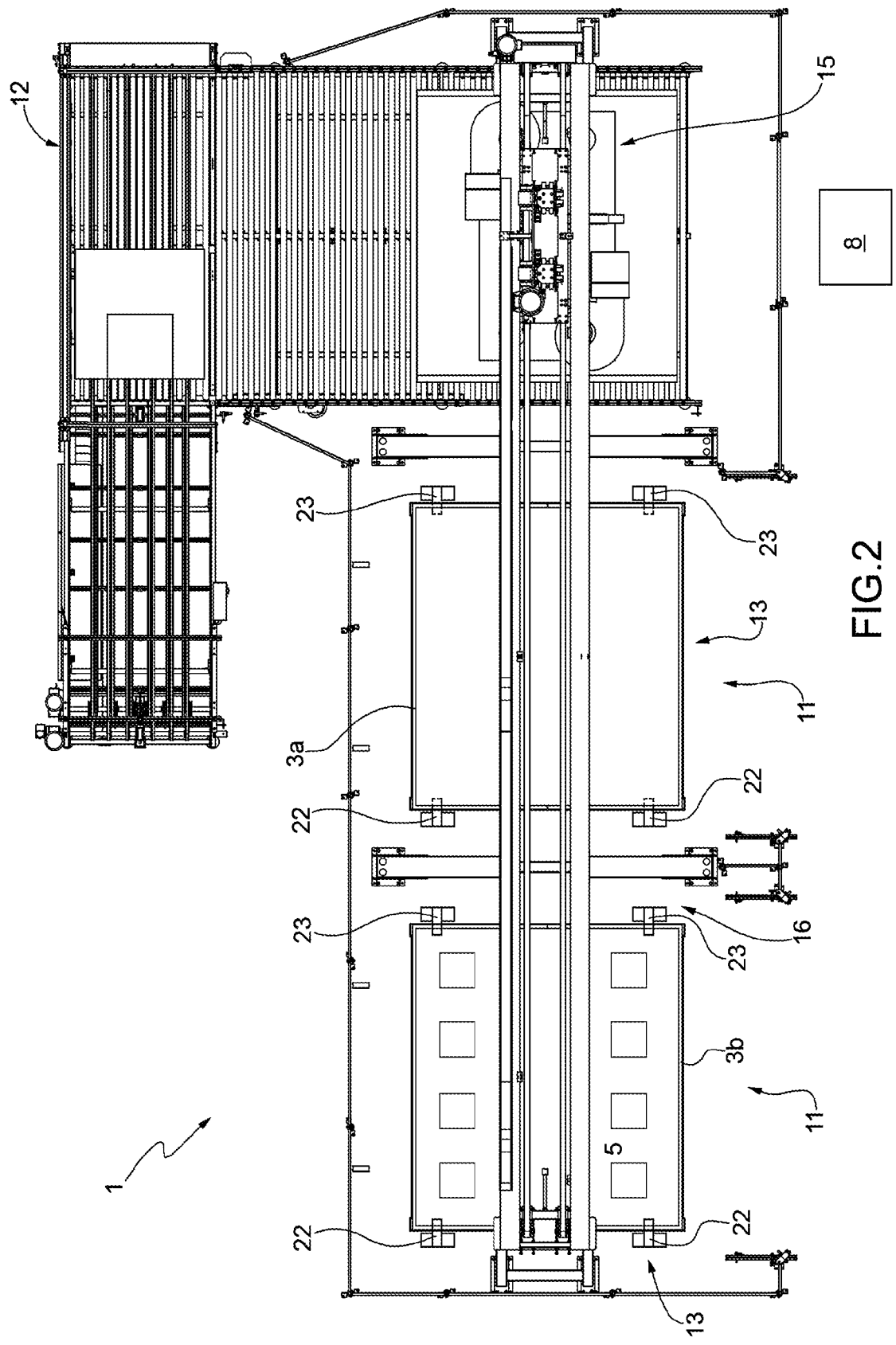
FIG. 2 illustrates a plan view of the part of the loading/unloading system of FIG. 1.

In FIGS. 1 and 2, reference numeral 1 partially illustrates, as a whole, a loading/unloading system for flat ceramic products 2. The flat ceramic products 2 are substantially flat products of the ceramic processing industry such as, for example, ceramic slabs and/or tiles, generally organized in groups (commonly known as "square panels").

More precisely but not necessarily, such loading/unloading system 1 of flat ceramic products 2 is configured to (adapted to) allow loading and unloading flat ceramic products 2 from or to a processing machine (not illustrated). In particular, the processing machine towards which, or from which, the loading/unloading system 1 loads or unloads the flat ceramic products 2 can be, for example, a storage machine of flat ceramic products 2, such as a warehouse or a pallet loading machine or a palletizing machine, or any processing machine, for example a sanding machine, a decoration machine, etc.

Advantageously but not necessarily, the loading/unloading system 1 of flat ceramic products 2 further comprises storage areas (not illustrated), in the area of which a plurality of loaded support structures 3a (i.e. comprising a plurality of flat ceramic products 2 stacked on top of one another) or of unloaded support structures 3b (i.e. substantially empty) are stored. In particular, each support structure 3a or 3b is configured to (adapted to) be capable of being picked up by a pick-up apparatus 4, preferably but not necessarily with forks, and comprises at least one support plane 5 which is configured to (adapted to) support a plurality of flat ceramic products 2 stacked on top of one another, or a plurality of groups ("square panels") of flat ceramic products 2 stacked on top of one another.

According to some embodiments (e.g. such as those illustrated in the accompanying figures), the support structures 3a and 3b are planks, having the above-described support plane 5 and a plurality of feet 6 for supporting the support plane 5. According to alternative non-limiting embodiments not illustrated, the support structures 3a and 3b are pallets, or euro pallets, or trays, or support crates, or any other type of container suitable for containing flat ceramic products 2 and for being picked up by a pick-up apparatus 4, preferably with forks.

Advantageously but not necessarily, the loading/unloading system 1 comprises at least: a first storage area comprising a first plurality of loaded support structures 3a, each of which comprises a support structure and a plurality of flat ceramic products 2 stacked on top of one another on the respective said support plane 5; and a second storage area comprising a second plurality of unloaded support structures 3b, each of which comprises a support structure and is without a plurality of flat ceramic products 2 stacked on top of one another.

According to some non-limiting embodiments, the loading/unloading system 1 comprises at least: two storage areas of loaded support structures 3a, one first storage area of loaded support structures 3a containing the loaded support structures 3a from which to pick up the flat ceramic products 2 intended to feed the processing machine, and one further storage area of loaded support structures 3a, containing the loaded support structures 3a on which the flat ceramic products 2 leaving the processing machine have been placed; and two storage areas of unloaded support structures 3b, one first storage area of unloaded support structures 3b, containing the unloaded support structures 3b on which to place the flat ceramic products 2 leaving the processing machine, and one further storage area of unloaded support structures 3b, containing the unloaded support structures 3b immediately after being emptied so as to feed the processing machine.

According to some advantageous but non-limiting embodiments (e.g. such as those illustrated in the accompanying figures), the loading/unloading system 1 further comprises at least one pick-up vehicle 7, advantageously but not necessarily automatically-driven, even more advantageously a plurality of pick-up vehicles 7. Each pick-up vehicle 7 comprises (at least) one pick-up apparatus 4 which is at least vertically movable and configured to (adapted to) support (at least) one loaded support structure 3a or (at least) one unloaded support structure 3b. In particular, according to non-limiting embodiments (for example as illustrated in FIGS. 3 to 7), the pick-up apparatus 4 comprises a pair of forks (not visible in the accompanying figures) vertically movable for lowering or lifting a (loaded or unloaded) support structure 3a or 3b. According to some non-limiting embodiments (for example as illustrated in FIGS. 3 to 7), the pick-up vehicle 7 further comprises at least one localization device 10 configured to (adapted to) allow the localization of the pick-up vehicle 7 within the loading/unloading system 1, in particular within a work area, i.e. within the area in which the (each) pick-up vehicle 7 is intended to move.

In particular, in some embodiments (for example, such as those illustrated in FIGS. 3 to 7), the localization device 10 is of the laser type and comprises at least one laser emitter, preferably but not necessarily rotating, configured to (adapted to) emit a laser beam in the area surrounding the pick-up vehicle 7 properly equipped with reflecting elements (not illustrated), and at least one optical reading member configured to (adapted to) detect the direction of the laser beam reflected by such reflecting elements, so as to detect the position in space (in particular in the work area) of the pick-up vehicle 7. Such solution advantageously allows a precise localization of the pick-up vehicle 7, without invasive interventions within the work area of the loading/unloading system 1, since it is sufficient to place a plurality of reflecting elements in the area in which the pick-up vehicle 7 is intended to move. Alternatively, such pick-up vehicles 7 can comprise an inertial-type localization device 10, or can be magnetically-driven by means of magnets placed on the floor, or can comprise a satellite navigation system by means of GPS, or a plurality of video cameras and a control device for reading the images captured by the video cameras and create a three-dimensional map of the space.

The loading/unloading system 1 further comprises at least one loading/unloading assembly 11 of flat ceramic products 2. In particular, the loading/unloading assembly 11 is adapted to (configured to) load at least one flat ceramic product 2 (more precisely but not necessarily, a plurality of flat ceramic products 2) on at least one unloaded support structure 3b (in particular, from a plurality of unloaded support structures 3b). Alternatively or additionally, the loading/unloading assembly 11 is adapted to (configured to) unload at least one flat ceramic product 2 (more precisely but not necessarily, a plurality of flat ceramic products 2) from (at least) one loaded support structure 3a (in particular, from a plurality of loaded support structures 3a).

According to the advantageous but non-limiting embodiments (for example as illustrated in FIGS. 1 and 2), the loading/unloading assembly 11 comprises: a conveying unit 12 (see FIG. 2) configured to (adapted to) convey (a plurality of) flat ceramic products 2, in particular a plurality of groups ("square panels") of flat ceramic products 2 from or towards the above-described processing machine of flat ceramic products 2; (at least) one loading/unloading device 13 for flat ceramic products 2 (in the case illustrated in FIGS. 1 and 2, two loading/unloading devices 13 for flat ceramic products 22), said loading/unloading device 13 has a bottom 14 (schematically illustrated by a broken line in FIGS. 1, 11, 12, 13) and is configured to (adapted to) receive a support structure 3a or 3b and to move (at least) such support structure 3a or 3b between a first position at a first height $h_0$ from the bottom 14, and at least a second position at a second height $h_1$ from the bottom 14, greater than the first height $h_0$; and at least one pick-up device 15 for picking up and transferring at least one flat ceramic product 2, in particular (at least) a group ("square panel") of flat ceramic products 2, from the conveying unit 12 to the (loaded or unloaded) support structure 3a or 3b placed in the area of the loading/unloading device 13, and/or vice versa.

Advantageously but not necessarily, the loading/unloading device 13 is configured to (adapted to) move the support structure 3b (i.e. at least the unloaded support structure 3b). In this way, it is possible to limit energy consumption, reduce the risks of damaging the loading/unloading device 13 and use a loading/unloading device 13 sized for moving a lower weight.

According to some non-limiting embodiments, the loading/unloading device 13 is configured to (adapted to) move (at least) the support structure 3a or 3b from the first position to the second position. In this way, it is possible to have a reduction of bulk; in fact, the pick-up vehicle 7 can bring a further unloaded support structure 3b in the first position. Alternatively, the pick-up device 15 can finish transferring the flat ceramic products 2 from the support structure 3a arranged in the second position while the pick-up vehicle 7 arranges a further loaded support structure 3a in the first position.

Advantageously but not necessarily, the loading/unloading device 13 comprises at least one bearing device 16 configured to (adapted to) bear a loaded support structure 3a (i.e. having on the relative support plane 5 a plurality of flat ceramic products 2 stacked on top of one another), and a moving device 17 for at least vertically moving the bearing device 16 at least between the aforementioned first and second positions.

According to some non-limiting embodiments, the second position is such to allow the insertion of a loaded support structure 3a under the bearing device 16 (in particular, in the first position) when such bearing device 16 is in the second position.

In other words, the difference between the second height $h_1$ and the first height $h_0$ is at least equal to a vertical height/dimension of a loaded support structure 3a. Advantageously, this allows placing in the area of the loading/unloading device 13 two (loaded or unloaded) support structures 3a or 3b simultaneously, in this way the pick-up vehicle 7 can place a new (loaded or unloaded) support structure 3a or 3b in the area of the loading/unloading device 13 before picking up the support structure 3a or 3b previously loaded or unloaded in the same loading/unloading device 13. This entails considerable advantages in terms of time and number of operations to be performed for the replacement of a (loaded or unloaded) support structure 3a or 3b once a loading or unloading cycle of the flat ceramic products 2 has been completed (i.e. once the maximum capacity of a support structure 3a or 3b has been reached or once the support structure 3a or 3b has been completely emptied). In fact, by so doing, the pick-up vehicle 7 can arrive in the area of the loading/unloading assembly 11, in particular of the loading/unloading device 13 having the new support structure 3b unloaded or having the new support structure 3a loaded, as for example illustrated in FIGS. 3 and 4, and 5 and 6, respectively, place such new (loaded or unloaded) support structure 3a or 3b resting on the bottom 14 (which acts as a further bearing device) or on the bearing device 16 (in particular, in the one of the two—bottom 14 and bearing device 16—which is empty) and pick up the support structure 3a or 3b just loaded or unloaded in the area of the same loading/unloading device 13, eliminating, with respect to the known loading/unloading systems 1 at least one of the trips that the pick-up vehicle 7 must accomplish between the storage areas and the loading/unloading assembly 11. In fact, in the known loading/unloading systems 1, the pick-up vehicle 7 must make a trip to pick up the support structure 3a or 3b that has just been loaded or unloaded, and after placing it in the specific storage area, it must pick up (making another trip) a new (loaded or unloaded) support structure 3a or 3b and place it again in the loading/unloading device 13.

Advantageously but not necessarily, the loading/unloading device 13, and even more particularly the moving device 17, is configured (sized) to move at least 300 kg, more particularly at least about 400 kg, so as to be capable of moving at least one unloaded support structure 3b.

According to some advantageous but non-limiting embodiments, the loading/unloading device 13, and even more particularly the moving device 17 is sized to move also a loaded support structure 3a at least between the first and the second position, in other words, the moving device 17 is sized to move the bearing device 16 with the loaded support structure 3a thereon, i.e. containing one or more (more precisely, a plurality of) flat ceramic articles 2. In particular, the loaded support structure 3a is substantially full, in particular having on the relative support plane 5 a number of stacked flat ceramic products 2 such to reach its maximum containment capacity.

Advantageously but not necessarily (in these cases), the loading/unloading device 13, and even more particularly the moving device 17 is sized to move at least 1500 kg, more particularly at least about 2000 kg, even more particularly at least about 2400 kg (so as to be capable of moving at least one loaded support structure 3a).

Advantageously but not necessarily, the pick-up vehicle 7 is configured to (adapted to) transfer at least one (loaded or unloaded) support structure 3a or 3b to the loading/unloading device 13 so that the (loaded or unloaded) support structure 3a or 3b rests on the bearing device 16 or on the further bearing device. In other words, the pick-up vehicle 7 is configured to (adapted to) transfer at least one (loaded or unloaded) support structure 3a or 3b (or the loaded and/or unloaded support structures 3a and/or 3b) (in particular, directly) on the bearing device 16 or on the further bearing device.

More precisely but not necessarily, the pick-up vehicle 7 and the loading/unloading device 13 are configured so that the pick-up vehicle 7 transfers at least one (loaded or unloaded) support structure 3a or 3b to the loading/unloading device 13 so that the (loaded or unloaded) support structure 3a or 3b rests on the bearing device 16 or on the further bearing device. In other words, the pick-up vehicle 7 and the loading/unloading device 13 are configured so that the pick-up vehicle transfers at least one (loaded or unloaded) support structure 3a or 3b (in particular, directly) on the bearing device 16 or on the further bearing device.

In particular, the control unit 8 is configured to operate the pick-up vehicle 7 so that the pick-up vehicle 7 transfers at least one (loaded or unloaded) support structure 3a or 3b to the loading/unloading device 13 so that the (loaded or unloaded) support structure 3a or 3b rests on the bearing device 16 or on the further bearing device. In other words, the control unit 8 is configured to operate the pick-up vehicle 7 so that the pick-up vehicle 7 transfers at least one (loaded or unloaded) support structure 3a or 3b (in particular, directly) on the bearing device 16 or on the further bearing device.

According to some advantageous but non-limiting embodiments (for example the one illustrated in the accompanying figures), the moving device 17 comprises at least one guide device 18 for guiding the bearing device 16 at least between the first position and the second position; said guide device 18 defines a first path P1, along which the bearing device 16 remains at least partially facing and in contact with a lower surface 18 of the support plane 5 of the (loaded or unloaded) support structure 3a or 3b positioned in the area of the loading/unloading device 13 so as to move such support structure 3a or 3b shifting from the first position to the second position, and/or vice versa; and a second path P2, along which the bearing device 16 moves from the first position to the second position, and/or vice versa.

Advantageously, the first path P1 and the second path P2 are separate from one another and not intersecting one another, in particular, the path P1 is the path along which the bearing device 16 is moved in order to lift or lower (at least) a support structure 3a or 3b (in particular, at least one unloaded support structure 3b), while the path P2 is the path along which the bearing device 16 is moved without interfering with the support structure 3a or 3b, when the support structure 3a or 3b rests on the bottom 14 (or, when provided, on a different further bearing device) or on the bearing device 16.

According to some non-limiting embodiments (as illustrated for example in FIGS. 1 to 11), the guide device 18 comprises (in particular, consists of) a first pair of vertical guides 20, each having a ring-like development, and a second pair of vertical guides 21, each having a ring-like development, advantageously but not necessarily, arranged with respect to one another so that each of the guides of the first pair of guides 20 is at least partially facing one of the guides of the second pair of guides 21. Furthermore, the first pair of guides 20 and the second pair of guides 21 are, advantageously but not necessarily, arranged with respect to one another at such a distance that at least one support structure 3a or 3b can be arranged between them (see for example FIGS. 1 to 11). In other words, the first pair of guides 20 and the second pair of guides 21 are arranged with respect to one another at a distance which is equal to at least one horizontal width/dimension of the support structure 3a or 3b. Furthermore, the bearing device 16 comprises (in particular, consists of) a first pair of bearing elements 22 associated with the first pair of guides 20 and a second pair of bearing elements 23 associated with the second pair of guides 21. In particular, the first and second pair of bearing elements 22 and 23 are coupled to the respective pairs of guides 20 and 21 so as to be movable, each, along the ring-like development of a respective guide, so as to define the above-described first path P1 and second path P2.

Advantageously but not necessarily the first pair of guides 20 and the second pair of guides 21 are movable towards and away from one another, so as to allow the movement of the bearing elements 22 and 23 between the first and the second position (in particular along the aforementioned path P2), without interfering with the support structure 3a or 3b, or with the bottom 14, or with the possible further bearing device.

Figure 13:
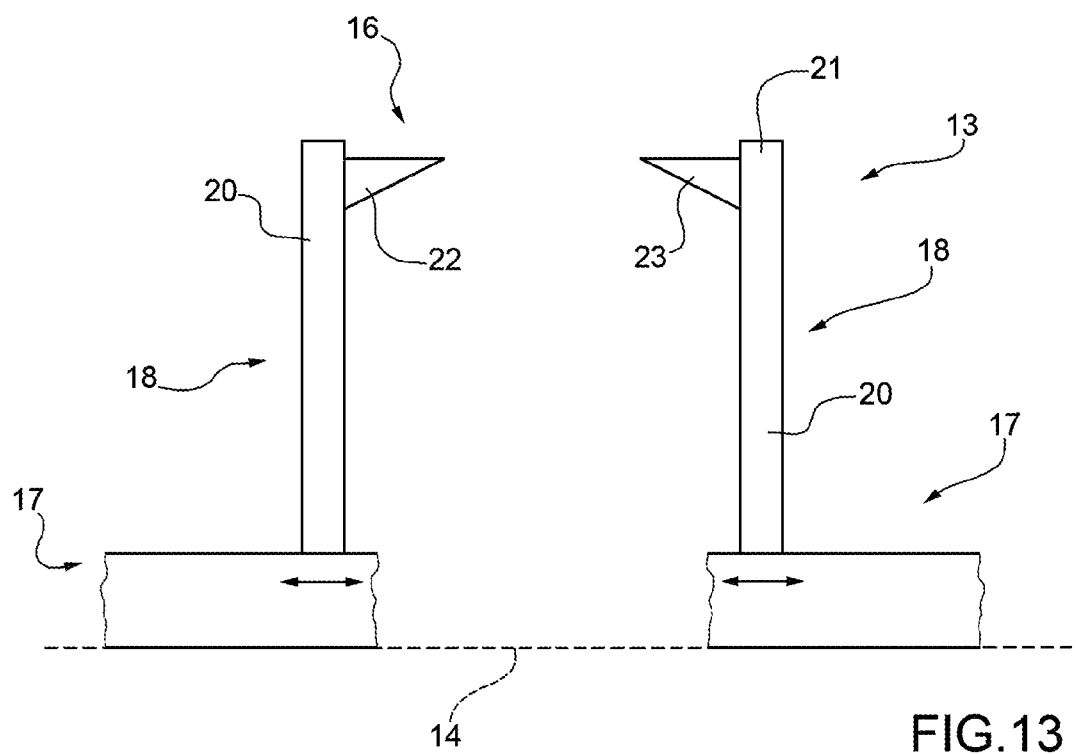

According to alternative embodiments such as that schematically illustrated in FIG. 13, the guide device 18 comprises (in particular, consists of) a first pair of vertical (linear) guides 20 and a second pair of vertical (linear) guides 21 arranged parallel and at least partially facing one another and movable away from and towards one another. In particular, also in such embodiments, the bearing device 16 comprises a first pair of bearing elements 22, each of which projects from one of the guides 20 of the first pair of guides 20 towards one of the guides 21 of the second pair of guides 21 and is movable along such guide 20; and a second pair of bearing elements 23, each of which bearing elements 23 projects from one of the guides 21 of the second pair of guides 21 towards one of the guides of the first pair of guides 20 and is movable along such guide 21. It follows that the movement of such pairs of guides 20 and 21 towards or away from one another causes the shifting from a first configuration, in which the bearing elements 22 of the first pair of bearing elements 22 are arranged at a first distance from the bearing elements 23 of the second pair of bearing elements 23; to a second configuration, in which the bearing elements 22 of the first pair of bearing elements 22 are arranged at a second distance, which is smaller than the first distance, with respect to the bearing elements 23 of the second pair of bearing elements 23. Advantageously but non-limitingly, the first distance is smaller than a main dimension of the support plane 5 of the support structure 3a or 3b which the relative loading/unloading device 13 is intended to contain; while the second distance is at least equal to the main width/dimension of the support plane 5 of the support structure 3a or 3b which the relative loading/unloading device 13 is intended to contain, so that the bearing elements 22 and 23 moving along the first pair of guides 20 and along the second pair of guides 21, respectively, define the first path P1 (when the pair of guides 20 and 21 are in the first configuration) and the second path P2 (when the pair of guides 20 and 21 are in the second configuration).

According to variants that are not illustrated, the first pair of guides 22 and the second pair of guides 23 are each replaced by a single guide configured to (adapted to) movably bring a single bearing element (or two bearing elements 22 and two bearing elements 23).

According to other non-limiting embodiments (such as the one illustrated in FIG. 12), the moving device 17 comprises: at least two rope and counterweight moving systems, preferably two pairs of rope and counterweight moving systems 20 and 21; arranged parallel to and at least partially facing one another so that their mutual distance is at least equal to the horizontal width/dimension of the support structure 3a or 3b; and of the bearing elements 22 and 23, each coupled to a rope and counterweight moving system of the pairs of rope and counterweight moving systems 20 and 21, each movable along the relative rope and counterweight moving system 20 and 21 so as to define said first path P1 and said second path P2. Also in this case, advantageously but not necessarily, the rope and counterweight moving systems 20 and 21 are configured to (adapted to) be moved away from and towards one another.

According to some advantageous but non-limiting embodiments, the loading/unloading device 13 comprises a further bearing device, which can coincide with the bottom 14, as in the accompanying figures, or (according to embodiments not illustrated) or not (for example, the further bearing device can be arranged resting on the bottom 14), in this case the moving device 17 must be such to ensure that, when the bearing device 16 moves along the path P2, it does not interfere (besides with the support structure 3a or 3b, when present) not even with such further bearing device 16 and/or with the bottom 14.

More precisely but not necessarily, when present, such further bearing device is fixed.

According to some non-limiting embodiments (such as the one illustrated in FIGS. 1 and 2), the pick-up device 15 is movably mounted, for example along a horizontal guide, between the loading/unloading device 13 and at least one segment of the conveying unit 12 and comprises at least one pick-up member 24 configured to (adapted to) grab and hold at least one flat ceramic product 2, in particular a group ("square panel") of flat ceramic products 2.

Advantageously, the pick-up device 15 comprises a plurality of pick-up members 24 distributed so as to grab and hold the flat ceramic product 2. In particular, according to some advantageous but non-limiting embodiments (such as the one illustrated in the accompanying FIGS. 1 and 2), the pick-up member 24 is configured to (adapted to) grab and hold the flat ceramic product 2 by suction, even more particularly the (each) pick-up member 24 comprises (in particular, is) a suction cup.

According to other advantageous but non-limiting embodiments, the (each) pick-up member 24 comprises (in particular, is) a gripper or another type of pick-up member.

According to some embodiments (such as those of FIGS. 1 and 2), the loading/unloading assembly 11 comprises at least two loading/unloading devices 13, identical to one another.

Preferably, in this case, the pick-up device 15 is configured to (adapted to) transfer a flat ceramic product 2, in particular a group of flat ceramic products 2, also from or towards such further loading/unloading device 13. According to alternative embodiments not illustrated, the loading/unloading assembly 11 comprises a further pick-up device configured to (adapted to) grab and hold at least one flat ceramic product 2 in particular a group ("square panel") of flat ceramic products 2 and to transfer it between the further loading/unloading device 13 and the conveying unit 12.

Advantageously but not necessarily, the loading/unloading system 1 further comprises at least one control unit 8 (schematically illustrated in FIGS. 1 and 2). Such control unit 8 is configured to (adapted to) operate (i.e. control) at least the loading/unloading device 13, the pick-up vehicle 7, and the pick-up device 15.

In particular, the control unit 8 is configured to (adapted to) cause the operation of the loading/unloading device 13 between the first position P1 and the second position P2, the operation of the pick-up vehicle 7 so as to pick up and transport (at least) a loaded support structure 3a to or from the loading/unloading device 13 (in particular, between one of the storage areas of the loaded support structures 3a and the loading/unloading device 13), (and/or) or an unloaded support structure 3b from or to the loading/unloading device 13 (between the loading/unloading device 13 and one of the storage areas of unloaded support structures 3b). The control unit 8 is further configured to (adapted to) operate the pick-up device 15 so as to grab and transfer at least one flat ceramic product 2 from the conveying unit 12 to the loading/unloading device 13, when an unloaded support structure 3b is arranged in the loading/unloading device 13, or from the loading/unloading device 13 to the conveying unit 12, when a loaded support structure 3a is arranged in the loading/unloading device 13.

In particular, the control unit 8 is configured to (adapted to) control the pick-up vehicle 7 so that (after positioning the further unloaded support structure 3b or the further loaded support structure 3a in the loading/unloading device 13) it remains in the area of the loading/unloading device 13 (more particularly, substantially stationary) until it proceeds to pick up the loaded support structure 3a or the unloaded support structure 3b, respectively.

Figure 5:
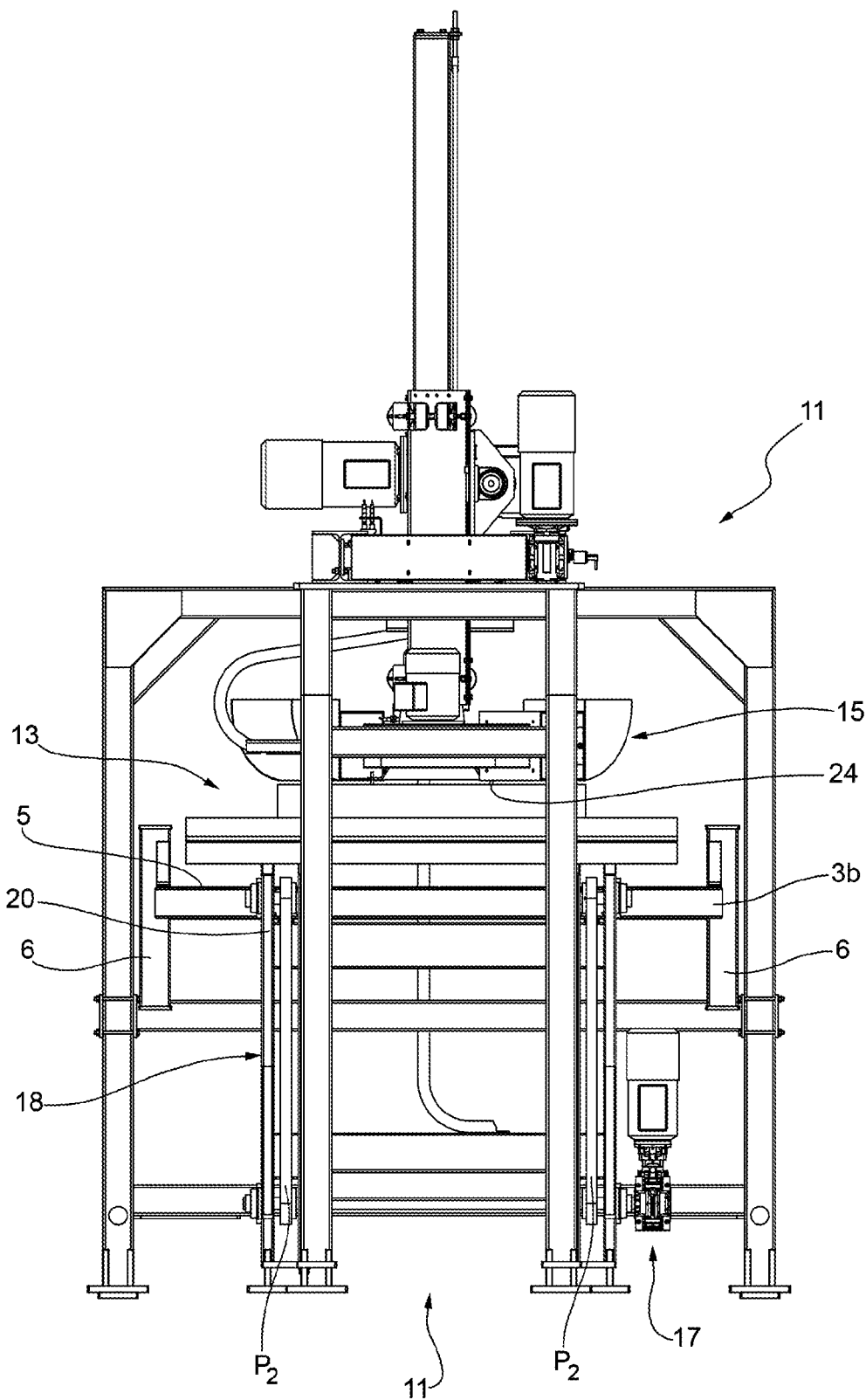
FIG. 5 illustrates a side view of a loading/unloading assembly which is part of the system of FIGS. 1 and 2, having an unloaded support structure in the area of the loading/unloading device.
Figure 6:
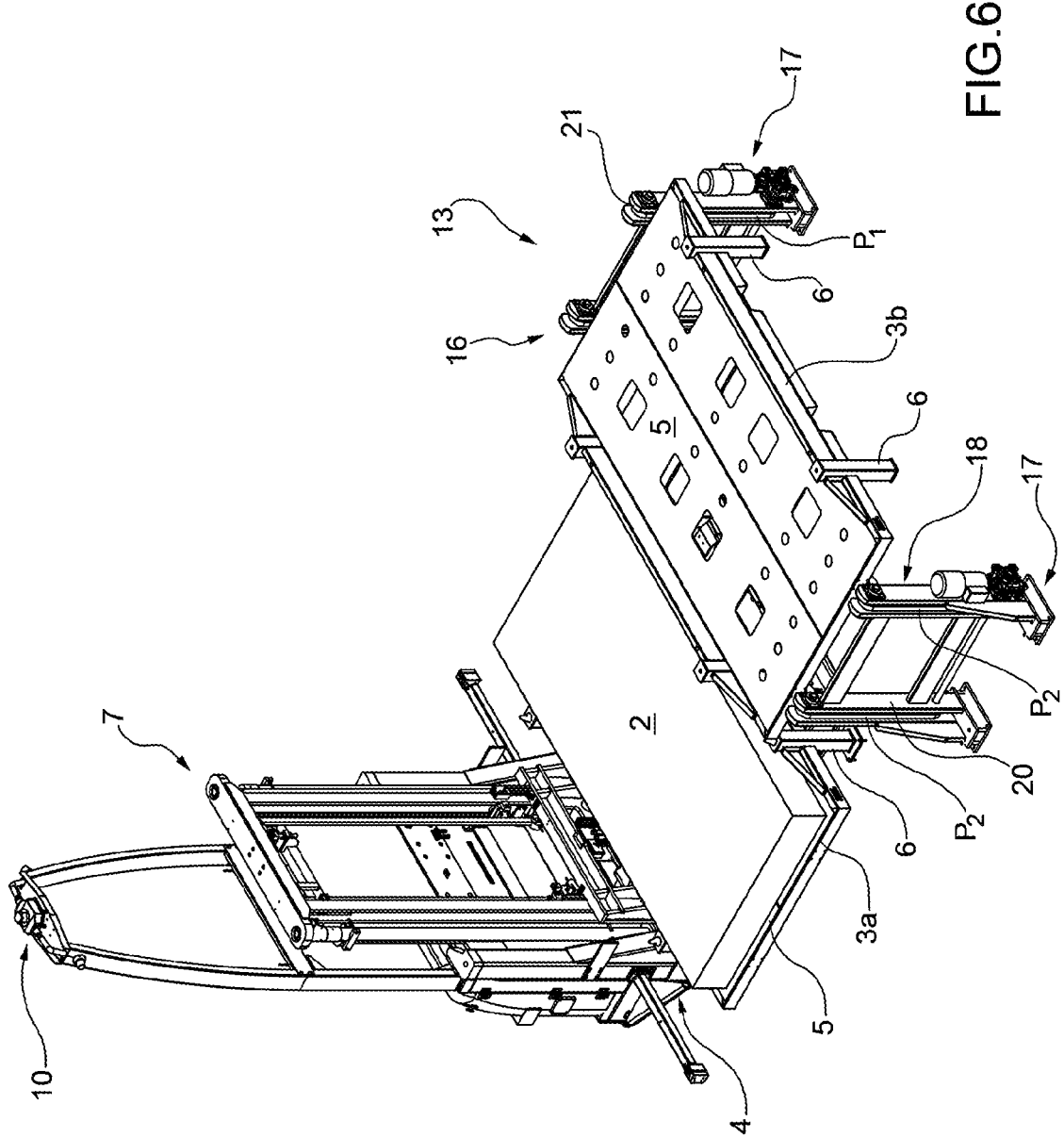
FIG. 6 illustrates a perspective view of the part of the loading/unloading assembly of FIG. 5 and of an automatically-driven transport vehicle which transports a loaded support structure towards such loading/unloading assembly.
Figure 7:
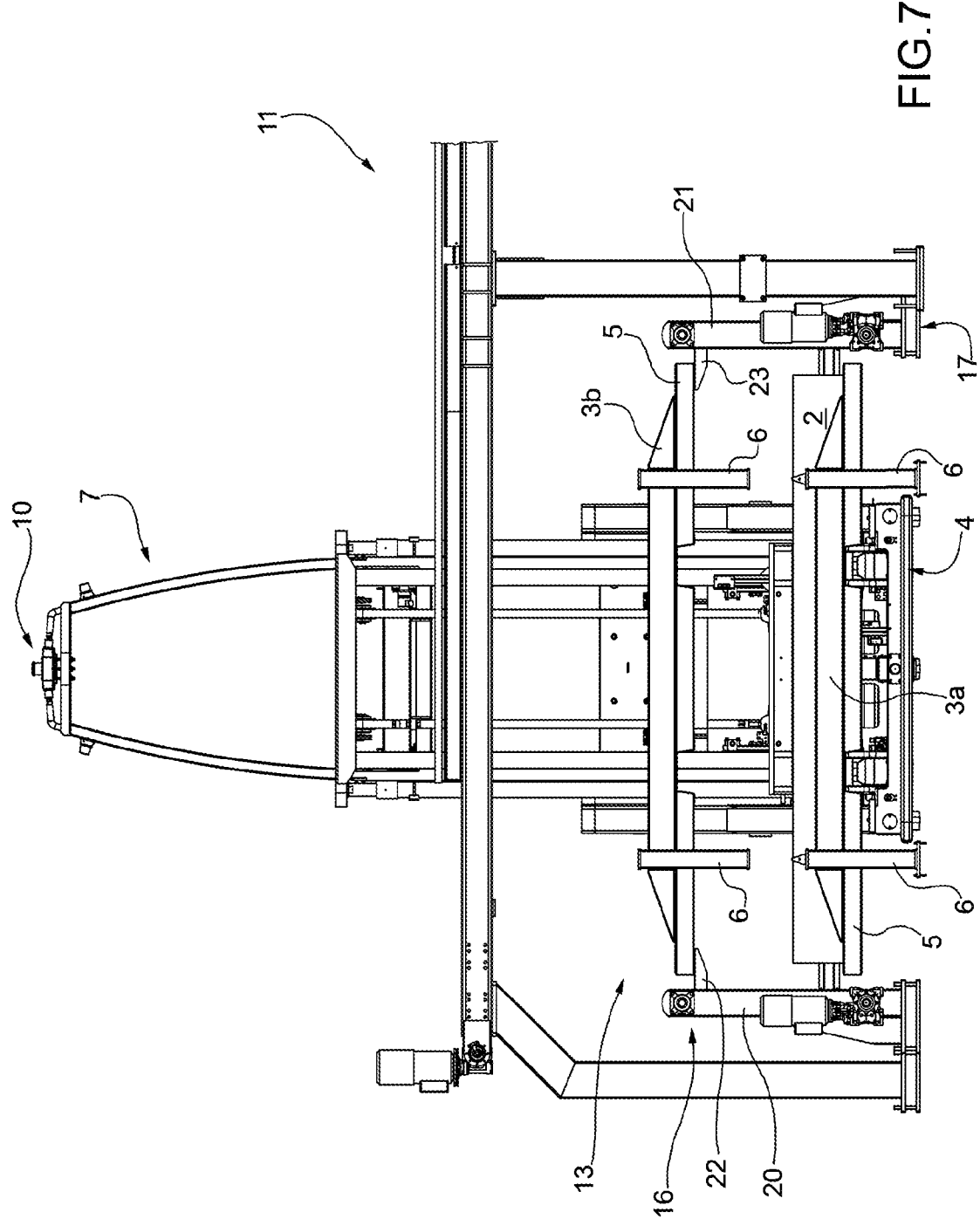
FIG. 7 illustrates a side view of the automatically-driven transport vehicle and of the same part of the loading/unloading assembly of FIGS. 5 and 6 when the automatically-driven transport vehicle positions the loaded support structure in a loading/unloading device of the loading/unloading assembly.
Figure 8:
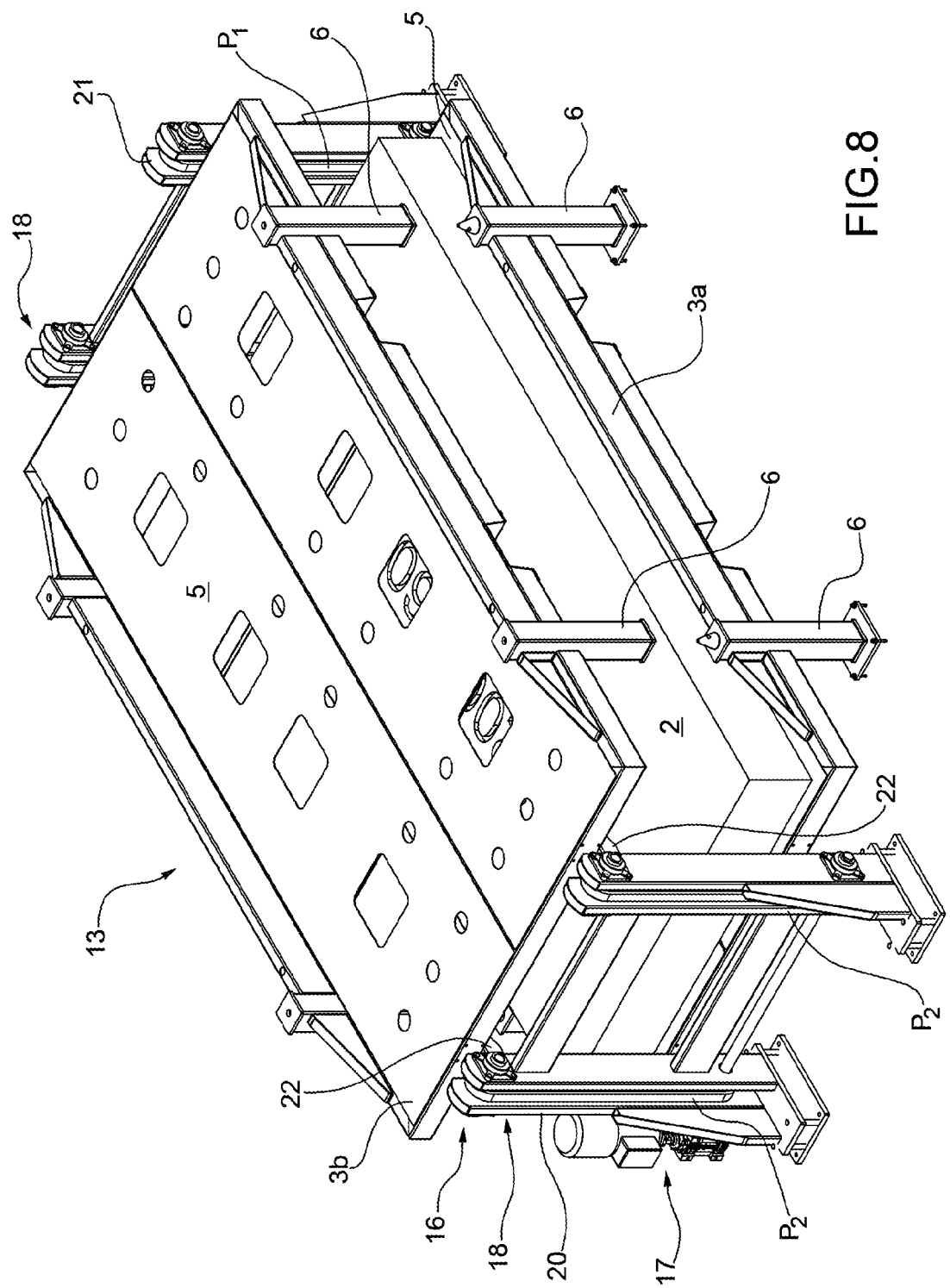
FIG. 8 illustrates a perspective view of a part of the loading/unloading device of FIG. 7, after the automatically-driven vehicle has positioned the loaded support structure.
Figure 10:
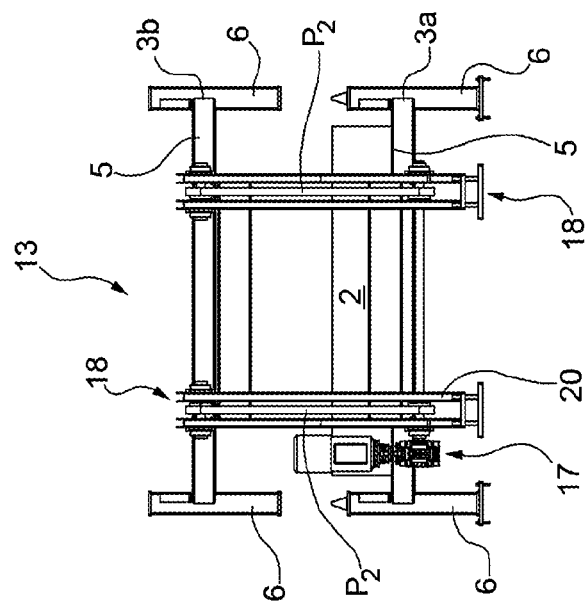
FIGS. 9 and 10 are a side view and a front view, respectively, of the loading/unloading device of FIG. 8.
Figure 9:
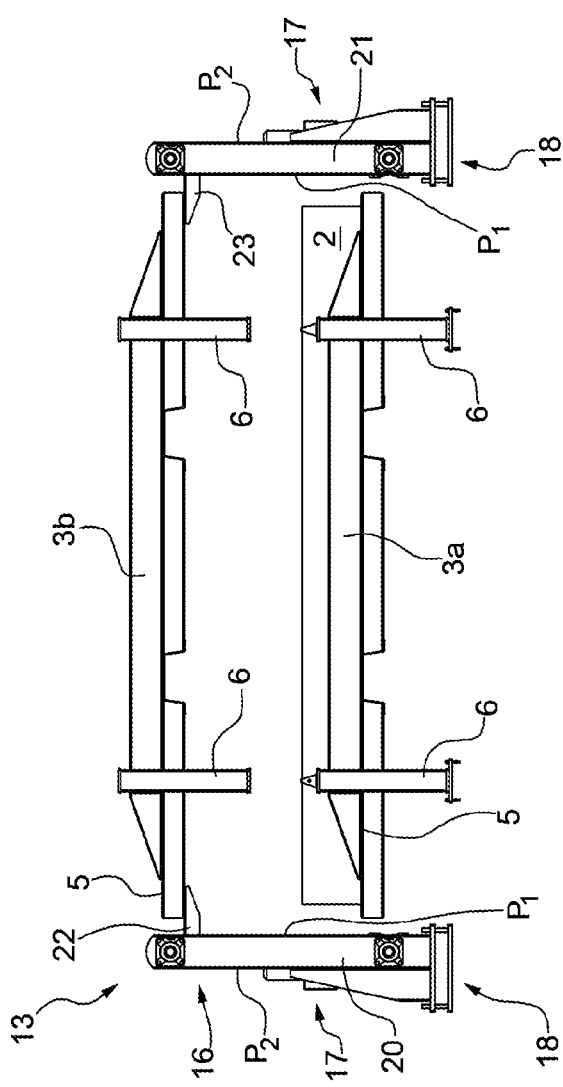
Figure 11:
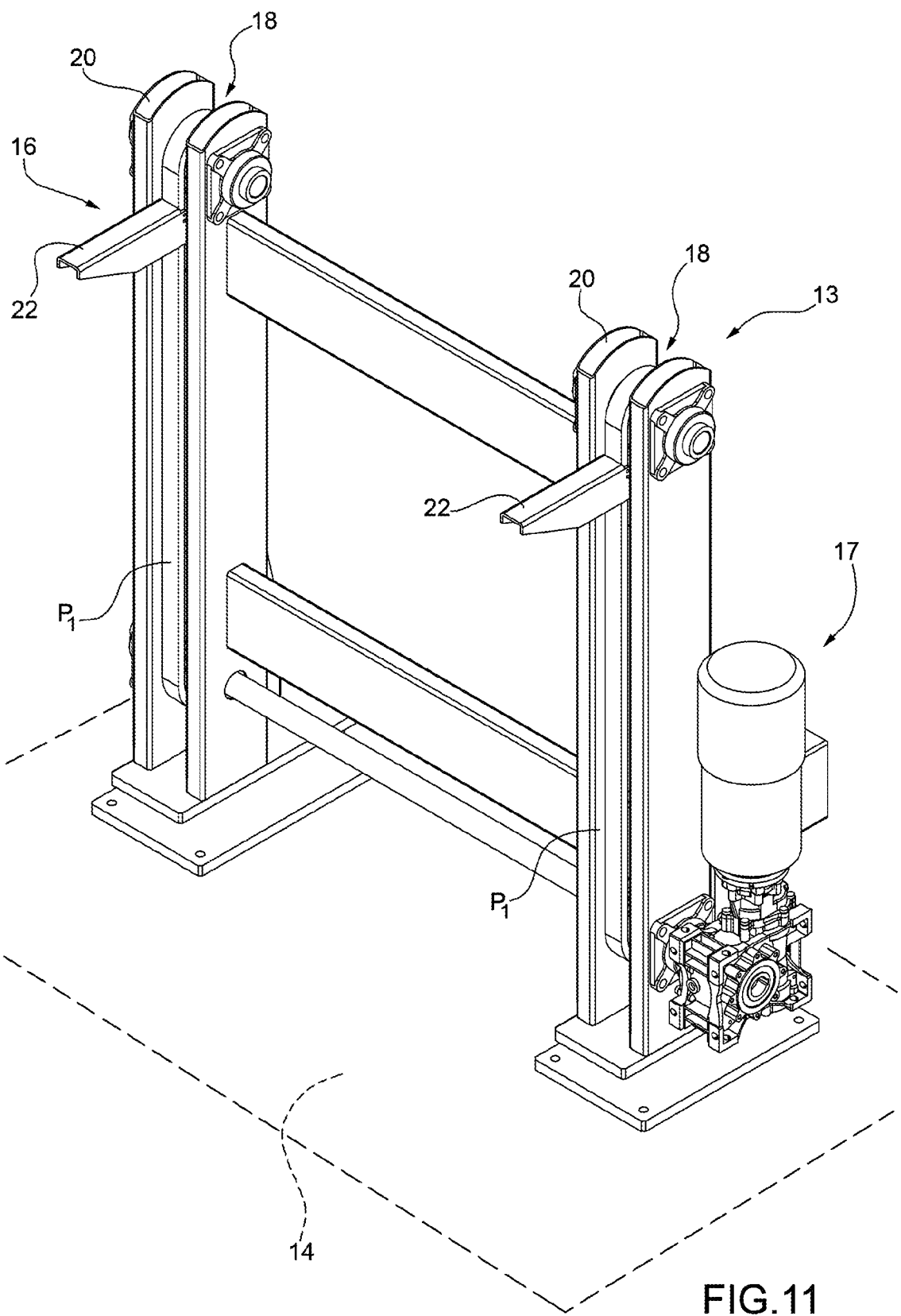
FIG. 11 illustrates a perspective view of a part of the lifting system of the loading/unloading device of FIGS. 1-10.
Figure 12:
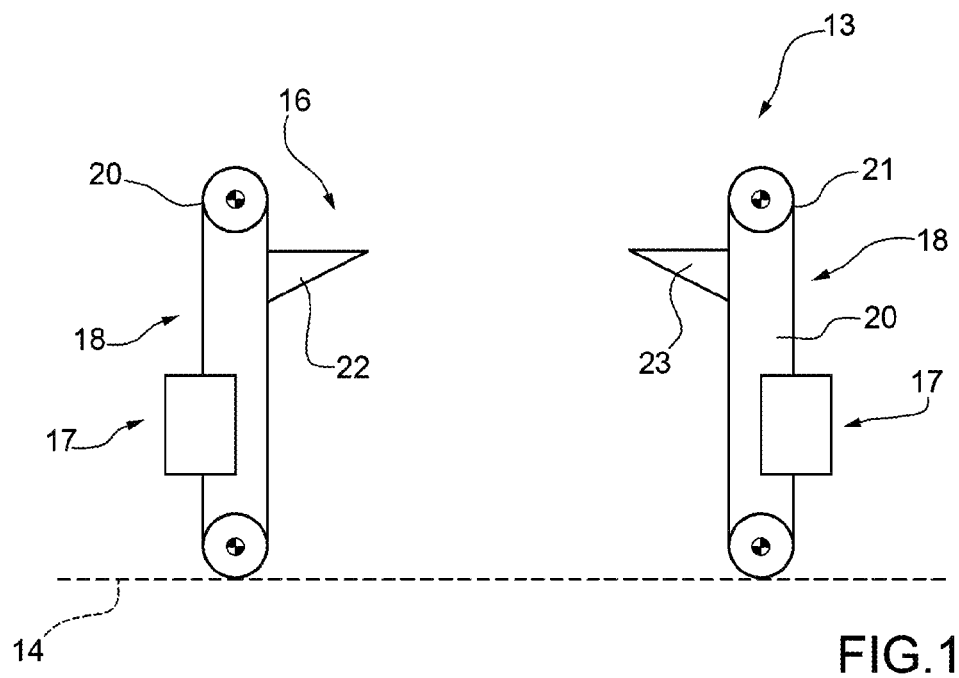
FIGS. 12 and 13 illustrate schematic views of a part of the lifting system of the loading/unloading device of FIGS. 1-10 according to further embodiments.

In particular, when the loading/unloading assembly 11 is used in loading, i.e. to transfer flat ceramic products 2 from the support plane 5 of a loaded support structure 3a towards the conveying unit 12 (until all flat ceramic products 2 of the loaded support structure 3a are transferred) so as to obtain an unloaded support structure 3b, the control unit 8 is configured to (adapted to) control the loading/unloading device 13, in particular the moving device 17, to move the unloaded support structure 3b (which results after emptying the loaded support structure 3a) from the first position to the second position, or vice versa; and the pick-up vehicle 7 to pick up a further loaded support structure 3*a* (from the first storage area of the loaded support structures 3*a*), transport it towards the loading/unloading device 13 and arrange it resting on the bottom 14 (which can act as a further bearing device) or on the bearing device 16 (see for example FIGS. 5, 6 and 7).

The control unit 8 is configured to (adapted to) further control the pick-up vehicle 7 so that (immediately after positioning the further loaded support structure 3*a* in the loading/unloading device 13) it picks up the unloaded support structure 3*b* (and transports it to the further storage area of unloaded support structures 3*b*).

More particularly, in this case (i.e. in loading) when the pick-up device 15 is configured to (adapted to) pick up the flat ceramic products 2 from the second position, i.e. from the support structure 3*a* or 3*b* placed in the second position, the control unit 8 operates the loading/unloading device 13, in particular the moving device 17, so that, after the loaded support structure 3*a* has been emptied, the unloaded support structure 3*b* is moved (by moving the bearing device 16, in particular along the path P1) from the second position to the first position and the pick-up vehicle 7 positions the further loaded support structure 3*a* resting on the bearing device 16 in the second position and (immediately after) picks up the unloaded support structure 3*b* from the first position. Whereas, when the pick-up device 15 is configured to (adapted to) pick up the flat ceramic products 2 from the first position, in particular from the loaded support structure 3*a* placed in the first position, the control unit 8 is configured to (adapted to) operate the loading/unloading device 13, in particular the moving device 17 so that, after the loaded support structure 3*a* has been emptied, the unloaded support structure 3*b* is moved (by moving the bearing device 16, in particular along the path P1) from the first position to the second position, and the pick-up vehicle 7 positions the further loaded support structure 3*a* resting on the bottom 14, or if provided on the further bearing device in the first position, and immediately after picks up the unloaded support structure 3*b* from the bearing device 16 in the second position.

It should be noted that when the control unit is configured to operate in this manner, the loading/unloading device 13 moves relatively low weights.

In particular, the control unit 8 is configured to (adapted to) control the pick-up vehicle 7 so that (after positioning the further loaded support structure 3*a* in the loading/unloading device 13) it remains in the area of the loading/unloading device 13 (more particularly, substantially stationary) until it proceeds to pick up the unloaded support structure 3*b*.

Alternatively, when the loading/unloading assembly 11 is used for unloading, i.e. to transfer flat ceramic products 2 from the conveying unit 12, thus from the processing machine, to the loading/unloading device 13, the control unit 8 operates the pick-up device 15 to transfer a plurality of flat ceramic products 2 onto an unloaded support structure 3*b*, arranging them stacked on top of one another so as to obtain a loaded support structure 3*a*.

Figure 3:
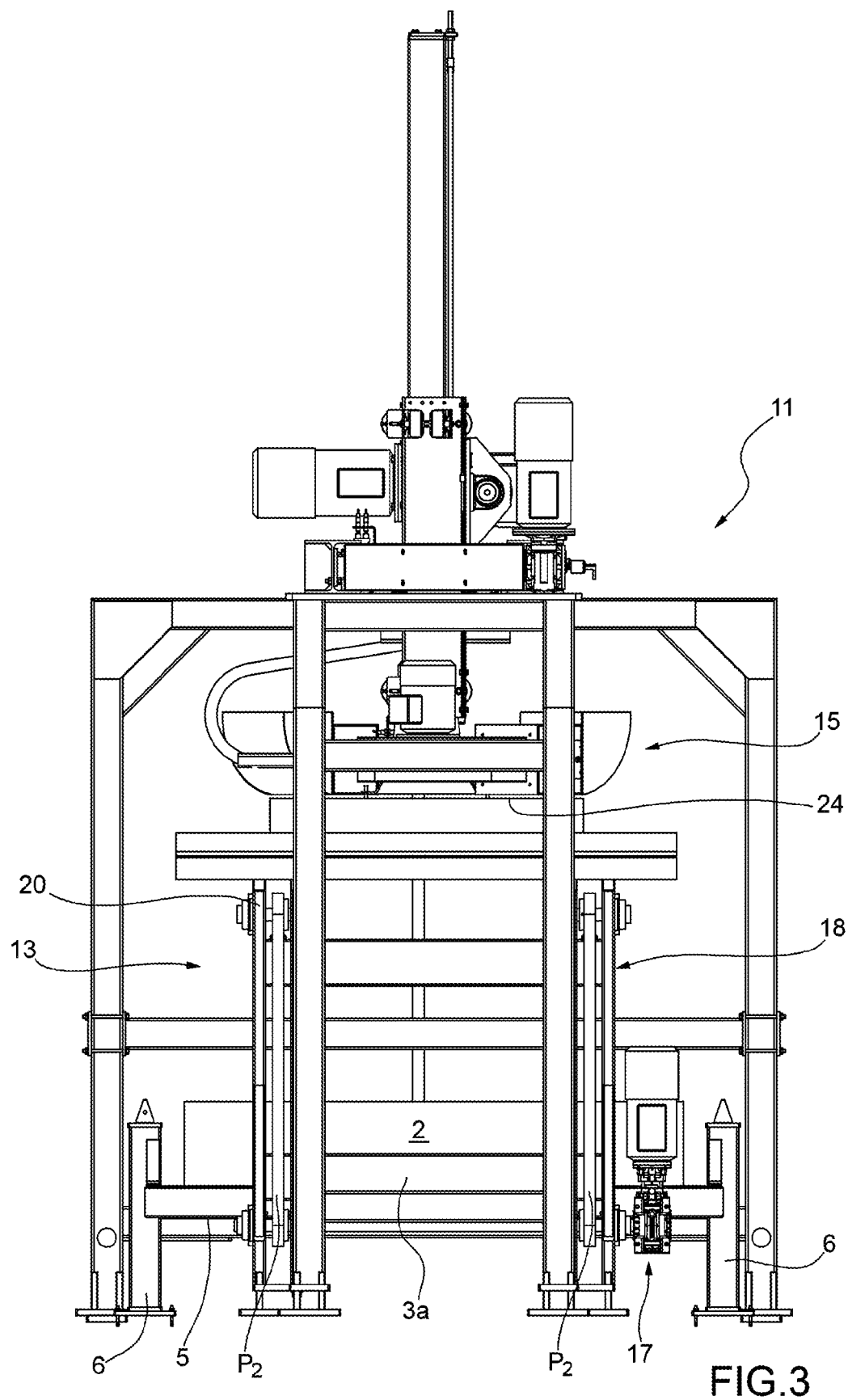
FIG. 3 illustrates a side view of a loading/unloading assembly which is part of the system of FIGS. 1 and 2 having a loaded support structure in the area of the loading/unloading device.
Figure 4:
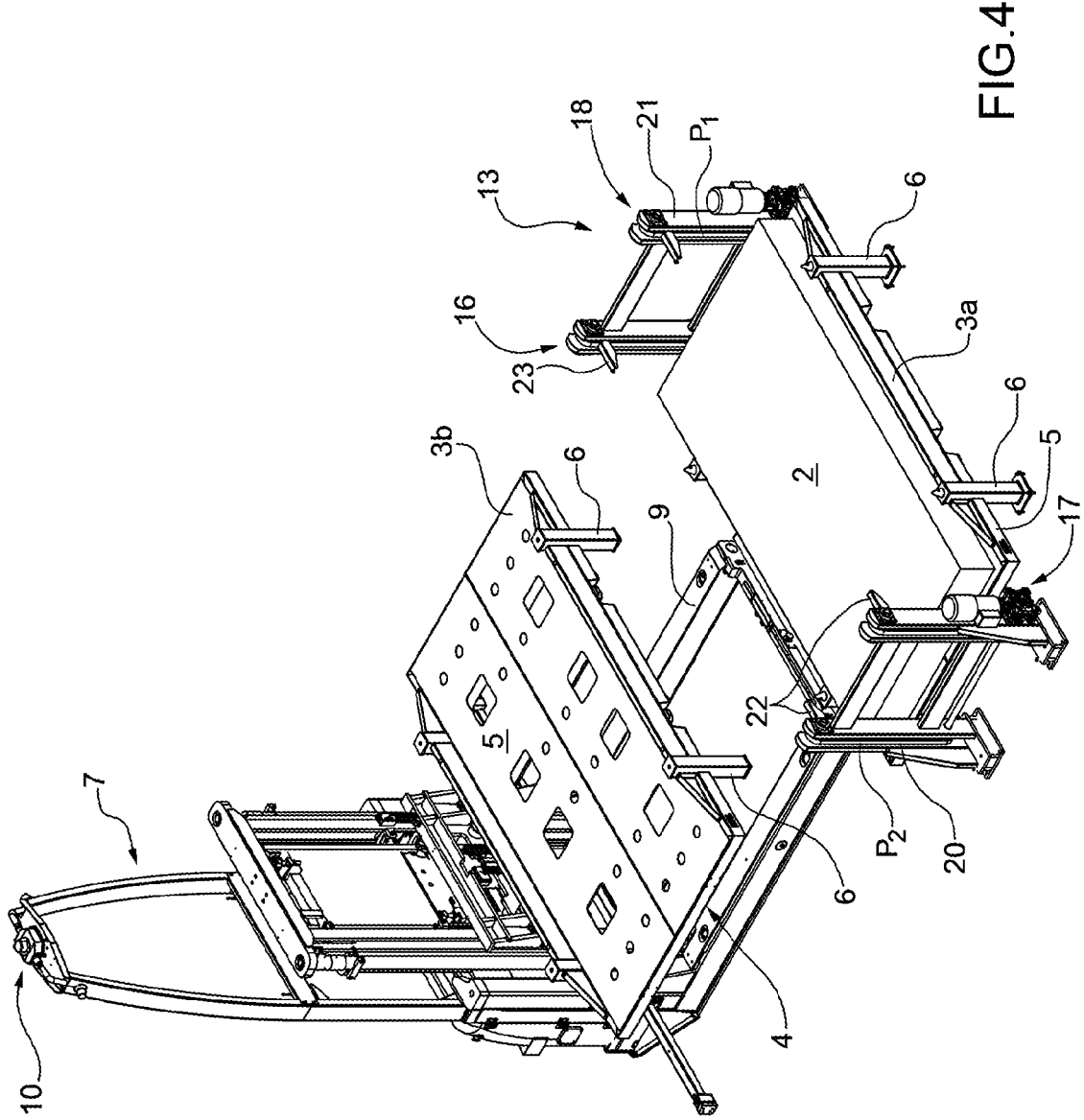
FIG. 4 illustrates a perspective view of the part of the loading/unloading assembly of FIG. 3 and of an automatically-driven transport vehicle which transports an unloaded support structure towards such loading/unloading assembly.

The control unit 8 is further configured to (adapted to) operate the pick-up vehicle 7, when the unloaded support structure 3*a* has been (or is about to be) filled (i.e. is about to reach the maximum containment capacity of flat ceramic products 2), so that the pick-up vehicle 7 first picks up a further unloaded support structure 3*b* (in particular, from the first storage area of unloaded support structures 3*b*), transports it (as illustrated in FIGS. 3 and 4) towards the loading/unloading device 13, arranges it resting on the bearing device 16 or on the bottom 14 (or, when provided, on the further bearing device), and (immediately after) picks up the loaded support structure 3*a* (which results from the filling of the unloaded support structure 3*b*) and, in particular, transports it to the further storage area of loaded support structures 3*a*.

The control unit 8 is also configured to (adapted to) operate the loading/unloading device 13, in particular the moving device 17, so as to move the further unloaded support structure 3*b* from the first position to the second position, or vice versa.

In particular, also in this case, when the pick-up device 15 is configured to (adapted to) transfer the flat ceramic products 2 onto the unloaded support structure 3*b* resting on the bottom 14 (or when provided, on the further bearing device) in the first position, the control unit 8 operates the pick-up vehicle 7 so that it positions the further unloaded support structure 3*b* resting on the bearing device 16 in the second position and (immediately after) picks up the loaded support structure 3*a* (which results after transferring the plurality of flat ceramic products 2 resting on the unloaded support structure 3*b*) from the first position; the control unit 8 then operates the loading/unloading device 13, in particular the moving device 17, to move (by moving the bearing device 16, in particular along the path P1) the further unloaded support structure 3*b* from the second position to the first position.

It should be noted that when the control unit is configured to operate in this manner, the loading/unloading device 13 moves relatively low weights downwards.

In particular, the control unit 8 is configured to (adapted to) control the pick-up vehicle 7 so that (after positioning the further unloaded support structure 3*b* in the loading/unloading device 13) it remains in the area of the loading/unloading device 13 (more particularly, substantially stationary) until it proceeds to pick up the loaded support structure 3*a*.

When the pick-up device 15 is configured to (adapted to) transfer the flat ceramic products 2 resting on the unloaded support structure 3*b* to the second position, the control unit 8 is configured to (adapted to) operate the pick-up vehicle 7 so that the latter grabs a further unloaded support structure 3*b* and transfers it resting on the bottom 14 (or when provided on the further bearing device), and immediately after picks up the loaded support structure 3*a* (which results after transferring the plurality of flat ceramic products 2 resting on the unloaded support structure 3*b*) and, in particular, transfers it to the further storage area of loaded support structures 3*a*, the control unit 8 is further configured to (adapted to) operate the loading/unloading device 13, in particular the moving device 17, so that, after the loaded support structure 3*a* has been picked up by the pick-up vehicle 7, the further unloaded support structure 3*b* is moved (by moving the bearing device 16, in particular along the path P1) from the first position to the second position.

It should be noted that when the control unit is configured to operate in this manner, the loading/unloading device 13 moves relatively low weights.

According to further embodiments, the loading/unloading device 13, in particular the moving device 17, is configured (in particular sized) to (also) move a loaded support structure 3*a* between the first position and the second position.

In this case, when the loading/unloading assembly 1 is used in loading, i.e. to transfer flat ceramic products 2 from the support plane 5 of a loaded support structure 3*a* towards the conveying unit 12, and thus towards the processing machine, the control unit 8 is configured to (adapted to) operate the pick-up vehicle 7 so that, when the loaded support structure 3*a* has been (or is about to be) emptied, the pick-up vehicle 7 picks up a further loaded support structure 3*a* (in particular, from the storage area of loaded support structures 3A), transports it to the loading/unloading device 13 and arranges it in the second position, in particular arranges it resting on the bearing device 16 in the second position, and immediately after (the same pick-up vehicle 7) picks up the first unloaded (i.e. emptied) support structure 3*b* arranged in the first position and, in particular, transports it to the further storage area of unloaded support structures 3*b*; the control unit 8 is also configured to (adapted to) operate (after the pick-up device 7 has picked up the unloaded support structure 3*b*) the loading/unloading device 13, in particular the moving device 17, so as to move the further loaded support structure 3*a* (by moving the bearing device 16, in particular along the path P1) from the second position to the first position.

It should be noted that when the control unit is configured to operate in this manner, the loading/unloading device 13 moves heavier weights downwards.

When the loading/unloading assembly 1 is used in unloading, i.e. to transfer flat ceramic products 2 from the conveying unit 12, thus from the processing machine, to the loading/unloading device 13 up to, in particular to an unloaded support structure 3*b* placed resting on the bottom 14 (or when provided on the further bearing device), the control unit 8 is configured to (adapted to) operate the loading/unloading device 13, in particular, the moving device 17, so as to move the loaded support structure 3*a* (obtained after arranging a plurality of flat ceramic products 2 on the unloaded support structure 3*b*) from the first position to the second position, and to operate the pick-up vehicle 7 so that it picks up a further unloaded support structure 3*b* (in particular, from the first storage area of the unloaded support structures 3*b*), transports it to the loading/unloading device 13 and arranges it resting on the bottom 14 (or when provided on the further bearing device) in the first position, and immediately after picks up the loaded support structure 3*a* and transports it to the further storage area of the loaded support structures 3*a*.

It is understood that the loading/unloading system 1 described above could comprise a plurality of manually-driven pick-up vehicles in place of the pick-up vehicles 7; such manually-driven pick-up vehicles, driven by respective operators, operate in a manner similar to what described above with reference to the pick-up vehicles 7.

In accordance with a second aspect of the present invention, a loading/unloading assembly as described above is also provided.

In accordance with a further aspect of the present invention, a method for transporting flat ceramic products 2 is also provided, advantageously but not necessarily implemented by the loading/unloading system 1 described above.

The method for transporting flat ceramic products 2 comprises: a loading/unloading step, during which a pick-up device 15 (advantageously of the type described above) transfers a plurality of flat ceramic products 2 between a conveying unit 12 and a support structure 3*a* or 3*b* arranged in the area of a loading/unloading device 13 (in other words, from the conveying unit 12 to the support structure 3*a* or 3*b*, or vice versa); a lifting/lowering step, during which the loading/unloading device 13 moves the support structure 3*a* or 3*b* between a first position (in particular, as described above) at a first height $h_0$ from the bottom 14 and a second position (in particular, as described above) at a second height $h_1$ from the bottom 14, which is greater than the first height $h_0$ (i.e., from the first position to the second position, or vice versa). Advantageously, the method further comprises a transport and positioning step, at least (partially) subsequent to the lifting/lowering step and preferably also to the loading/unloading step, during which a pick-up vehicle 7 (advantageously but not necessarily of the type described above) transports a further (loaded or unloaded) support structure 3 to the loading/unloading device 13 and positions such further (loaded or unloaded) support structure 3*a* or 3*b* in the first position (i.e. resting on the bottom 14 or, when provided, on the further bearing device) when, during the lifting/lowering step, the support structure 3*a* or 3*b* has been brought into the second position, or positions such further (loaded or unloaded) support structure 3*a* or 3*b* in the second position, when, during the lifting/lowering step, the support structure 3*a* or 3*b* has been brought into the first position.

In particular, advantageously but not necessarily, when, during the loading/unloading step, the pick-up device 15 transfers the plurality of flat ceramic products 2 from the loaded support structure 3*a* to the conveying unit 12, the further support structure 3*a* or 3*b* picked up and transported during the transport and positioning step comprises a further plurality of flat ceramic products 2, i.e. it is a loaded support structure 3*a*; whereas, when during the loading/unloading step the pick-up device 15 transfers the plurality of flat ceramic products 2 from the conveying unit 12 to the support structure 3*b* arranged in the area of a loading/unloading device 13, the further support structure 3*a* or 3*b* picked up and transported during the transport and positioning step is an unloaded support structure 3*b*, i.e. it is substantially empty.

According to some advantageous but non-limiting embodiments, the method further comprises a pick-up step, which is (at least partially) subsequent to the transport and positioning step (and the loading/unloading step) and during which the pick-up vehicle 7 picks up the loaded or unloaded support structure 3*a* or 3*b*, in particular, the support structure 3*a* or 3*b* (just loaded or unloaded), from the loading/unloading device 13 and, advantageously but not necessarily, transports it towards the further storage area of the (loaded or unloaded) support structures 3*a* or 3*b*.

Advantageously but not necessarily, between the transport and positioning step and the pick-up step, the pick-up vehicle 3 remains in the area of the loading/unloading device 13 (more particularly, substantially stationary).

Advantageously but not necessarily, during the transport and positioning step, the pick-up vehicle 7 transfers at least one (loaded or unloaded) support structure 3*a* or 3*b* to the loading/unloading device 13 so that the (loaded or unloaded) support structure 3*a* or 3*b* rests on the bearing device 16 or on the further bearing device. In other words, during the transport and positioning step, the pick-up vehicle 7 transfers at least one (loaded or unloaded) support structure 3*a* or 3*b* (or the loaded and/or unloaded support structures 3*a* and/or 3*b*) (in particular, directly) on the bearing device 16 or on the further bearing device.

According to some non-limiting embodiments, during the transport and positioning step, the control unit 8 operates the pick-up vehicle 7 so that the pick-up vehicle transfers at least one (loaded or unloaded) support structure 3*a* or 3*b* to the loading/unloading device 13 so that the (loaded or unloaded) support structure 3*a* or 3*b* rests on the bearing device 16 or on the further bearing device. In other words, during the transport and positioning step, the control unit 8 operates the pick-up vehicle 7 so that the pick-up vehicle transfers at least one (loaded or unloaded) support structure 3*a* or 3*b* (in particular, directly) on the bearing device 16 or on the further bearing device.

According to some non-limiting embodiments, the lowering/lifting step is subsequent to the loading/unloading step. According to other non-limiting embodiments, the lowering/lifting step is prior to the loading/unloading step.

In particular, in loading, i.e. when the flat ceramic products 2 (stacked on top of one another on the support plane 5 of a loaded support structure 3a) are transferred from the loaded support structure 3a to the conveying unit 12, and thus to the processing machine, the lowering/lifting step precedes the loading/unloading step, when the loading/unloading device 13, in particular the moving device 17, is sized to move the loaded support structure 3a. In this case, in fact, the loaded support structure 3a is first placed (by the pick-up vehicle 7, during the transport and positioning step) resting on the bearing device 16 in the second position and then it is lowered from the second position to the first position before the loading/unloading step. Whereas, still in loading, when the loading/unloading device 13, the lowering/lifting step is subsequent to the loading/unloading step (and, in particular, the moving device 17 is sized to move (only) the support structure 3b). In fact, in this case, the loaded support structure 3a is placed (by the pick-up vehicle 7, during the transport and positioning step) resting on the bottom 14 (or when provided on the further bearing device) in the first position or on the bearing device 16 in the second position and, only after being emptied, therefore after the loading/unloading step, is it lowered or lifted, moving it from the second position to the first position, or vice versa.

In unloading, i.e. when the flat ceramic products 2 are transferred from the conveying unit 12 (and thus, in particular, from the processing machine) to the unloaded support structure 3b, the lowering/lifting step is prior to the loading/unloading step (and, in particular, the loading/unloading device 13, more particularly the moving device 17, is sized to move the unloaded support structure 3b). In fact, in this case the unloaded support structure 3b is placed (by the pick-up vehicle 7, during the transport and positioning step) resting on the bottom 14 (or when provided on the further bearing device) in the first position or on the bearing device 16 in the second position and, only after being lowered or lifted, moving it from the second position to the first position, or vice versa, is it filled. Alternatively (in particular when, instead, the loading/unloading device 13, in particular the moving device 17, is sized to move the loaded support structure 3a), first the unloaded support structure 3b is filled (during the loading/unloading step), preferably resting on the bottom 14 (or when provided, on the further bearing device), and after (once filled) it is moved, preferably in lifting from the first to the second position, so as to be capable of placing (during the transport and positioning step) resting on the bottom 14 the further unloaded structure 3b to be filled.

According to some non-limiting embodiments (therefore), during the lowering/lifting step, the loading/unloading device 13 moves the (loaded or unloaded) support structure 3a or 3b from the second position to the first position.

Alternatively, during the lowering/lifting step, the loading/unloading device 13 moves the (loaded or unloaded) support structure 3a or 3b (loaded or unloaded) from the first position to the second position.

According to some non-limiting embodiments, during the loading/unloading step, the pick-up device 15 transfers the plurality of flat ceramic products 2 from the support structure 3a; 3b arranged in the area of a loading/unloading device (13) to the conveying unit 12. In these cases, in particular, during the transport and positioning step, the further support structure 3a or 3b comprises a further plurality of flat ceramic products 2.

Alternatively, during the loading/unloading step, the pick-up device 15 transfers the plurality of flat ceramic products 2 from the conveying unit 12 to the support structure 3a or 3b arranged in the area of a loading/unloading device 13. In these cases, during the transport and positioning step, the further support structure 3a or 3b is substantially empty.

In particular, in loading, (i.e. when the flat ceramic products 2 are transferred from the loaded support structure 3a to the conveying unit 12, and thus to the processing machine), during the lowering/lifting step the (loaded or unloaded) support structure 3a or 3b is lowered from the second position to the first position, when the loading/unloading device 13, in particular the moving device 17, is sized to move a loaded support structure 3a or when the loading/unloading device 13, in particular the moving device 17, is sized to move an unloaded support structure 3b and the pick-up device 15 is configured to (adapted to) pick up and transfer the flat ceramic products 2 from the loaded support structure 3a arranged in the second position; whereas, when the loading/unloading device 13, in particular the moving device 17, is sized to move an unloaded support structure 3b and the pick-up device 15 is configured to (adapted to) pick up and transfer the flat ceramic products 2 from the loaded support structure 3a arranged in the first position, during the lowering/lifting step the unloaded support structure 3b is lifted from the first position to the second position.

In unloading (i.e. when the flat ceramic products 2 are transferred from the conveying unit 12, and thus from the processing machine, to the loaded support structure 3a), during the lowering/lifting step, respectively, the support structure 3a or 3b is lifted from the first position to the second position when the loading/unloading device 13, in particular the moving device 17, is sized to move a loaded support structure 3a, or when the loading/unloading device 13, in particular the moving device 17 is sized to move an unloaded support structure 3b and the pick-up device 15 is configured to (adapted to) transfer the flat ceramic products 2 resting on the support structure 3a or 3b into the second position; whereas, when the loading/unloading device 13, in particular the moving device 17, is sized to move an unloaded support structure 3b and the pick-up device 15 is configured to (adapted to) pick up and transfer the flat ceramic products 2 from the loaded support structure 3a arranged in the first position, during the lowering/lifting step the unloaded support structure 3b is lowered from the second position to the first position.

In accordance with some non-limiting embodiments, the method further comprises a feeding step which is (at least partially) prior to the loading/unloading step and the lifting/lowering step, during which the pick-up vehicle 7 picks up a loaded support structure 3a from the first storage area of the loaded support structures 3a or an unloaded support structure 3b from the first storage area of the unloaded support structures 3b and transports it to the loading/unloading device 13 and rests it on the bearing device 16 in the second position or on the bottom 14 (or when provided on the further bearing device) in the first position.

The scope of the present invention has various advantages with respect to the prior art. Among these we mention the following.

The loading/unloading system 1, the loading/unloading assembly 11 and the method for transporting flat ceramic products 2 of the present invention allow reducing the number of trips that the pick-up vehicle 7 has to accomplish between the different storage areas and the loading/unloading assembly 11. In fact, the presence of the loading/unloading device 13 provided with a bearing device 16 and a moving device 17 allows having in the area of the loading/unloading device 13 two support structures 3a or 3b simultaneously, one that has just been loaded or unloaded and one that is intended to be loaded or unloaded in the subsequent loading/unloading step, which means that once the loading or unloading of a support structure 3a or 3b has been completed (or just before completion), the pick-up vehicle 7 can pick up from the specific storage area a new support structure 3a or 3b to be placed in the area of the loading/unloading device 13, even before picking up the already loaded or unloaded support structure 3a or 3b, and can pick up such already loaded or unloaded support structure 3a or 3b, in actual fact reducing at least one outward trip of the pick-up vehicle 7 from the loading/unloading assembly 11 to one of the storage areas for placing the support structure 3a or 3b that has just been loaded or unloaded and a return trip towards a storage area for picking up the new support structure 3a or 3b. This entails a consequent saving in terms of time necessary for the replacement of a support structure 3a or 3b, but also an increase in the number of loading/unloading assemblies 11 which can be served for the same number of automatically-driven pick-up vehicles 7.

The invention claimed is:

1. A loading/unloading system for flat ceramic products comprising at least one loading/unloading assembly for flat ceramic products, the loading/unloading assembly in turn comprises:
    a conveying unit, which is configured to convey a plurality of flat ceramic products;
    at least one loading/unloading device for flat ceramic products, which has a bottom and is configured to receive a support structure;
    the support structure is configured to be capable of being picked up by a pick-up apparatus and comprises at least one support plane, which is configured to support a plurality of flat ceramic products stacked on top of one another; and
    at least one pick-up device to pick up and transfer at least one flat ceramic product from said conveying unit to said support structure and/or vice versa;
    the loading/unloading device being configured to move at least said support structure between a first position at a first height from said bottom and at least one second position at a second height from said bottom, said second height being greater than the first height, and comprises a bearing device, which is configured to bear at least said support structure, a moving device to move said bearing device between the first position and the second position, and a further bearing device;
    said moving device comprising at least one guide device to guide said bearing device at least between said first position and said second position;
    said guide device defining a first path, along which said bearing device remains at least partially facing and in contact with a lower surface of said support plane so as to move at least said support structure while shifting from said first position to said second position and/or vice versa; and a second path, along which said bearing device moves from said first position to said second position and/or vice versa; the first path and the second path being separated from one another and not intersecting one another;
    the loading/unloading system further comprises:
    at least one pick-up vehicle, which comprises said pick-up apparatus, which is at least vertically movable and is configured to support at least said support structure and to transfer at least said support structure to said loading/unloading device so that said support structure rests on said bearing device or on said further bearing device; and
    a control unit, which is configured to operate:
    said at least one pick-up vehicle so as to pick up and transport at least said support structure from and/or to said loading/unloading device;
    said pick-up device so as to pick-up and transfer at least one flat ceramic product between said conveying unit and said loading/unloading device; and
    said loading/unloading device between said first position and said second position,
    wherein said control unit is configured to control said at least one pick-up vehicle, said pick-up device and said loading/unloading device in such a way that:
        when the pick-up vehicle transfers at least one first loaded support structure to said loading/unloading device so that it rests on said bearing device or on said further bearing device,
        said pick-up device picks up and transfers said flat ceramic products stacked on top of one another on said support plane of said first loaded support structure towards said conveying unit so as to obtain a first unloaded support structure;
        said loading/unloading device, in particular said moving device, moves said first unloaded support structure from said second position to said first position or vice versa; and
        said at least one pick-up vehicle transports a further loaded support structure towards said loading/unloading device and places it resting on said further bearing device or on said bearing device; and
        the pick-up vehicle picks up said first unloaded support structure; and
        when the pick-up vehicle transfer at least one second unloaded support structure to said loading/unloading device so that it rests on said bearing device or on said further bearing device, said pick-up device transfers, onto said second unloaded support structure, a plurality of flat ceramic products stacked on top of one another so as to obtain a second loaded support structure;
        said at least one pick-up vehicle transports a further unloaded support structure towards said loading/unloading device and places it resting on said bearing device or on said further bearing device and said at least one pick-up vehicle picks up said second loaded support structure; and said loading/unloading device, in particular the moving device, moves said further unloaded support structure from said first position to said second position or vice versa.

2. The loading/unloading system according to claim 1, wherein said control unit is configured to operate said at least one pick-up vehicle so that: it picks up a first support structure arranged resting on said bearing device or on said further bearing device and transfers a further support structure to said loading/unloading device so that it rests on said further bearing device or on said bearing device, respectively.

3. The loading/unloading system according to claim 1, wherein said loading/unloading device, in particular the moving device, is configured to move said support structure and said plurality of flat ceramic products stacked on top of one another on said support plane at least between said first position and said second position.

4. The loading/unloading system according to claim 1, wherein:
said guide device comprises at least one first vertical guide having a ring-like development and at least one second vertical guide having a ring-like development; and
said bearing device comprises at least one first bearing element and at least one second bearing element, which are associated with said at least one rut guide and with said at least one second guide, respectively, so as to be movable along the relative ring-like development of said at least one first guide and of said at least one second guide, respectively, in order to define said first path and said second path.

5. The loading/unloading system according to claim 1, wherein:
said guide device comprises at least one first vertical guide and one second vertical guide arranged parallel to one another; and
said bearing device comprises at least one first bearing element, which projects from said first guide towards said second guide and is movable along said first guide, and a second bearing element, which projects from said second guide towards said first guide and is movable along said second guide;
said first guide and said second guide being movable away from and close to one another between a first configuration, in which said first bearing element and said second bearing element are arranged at a first distance from one another, and a second configuration, in which said first bearing element and said second bearing element are arranged at a second distance from one another, which is smaller than the first distance, so as to define said first path and said second path.

6. The loading/unloading system according to claim 1, wherein said pick-up device is movably mounted between said loading/unloading device and at least one segment of said conveying unit and comprises at least one pick-up member, which is configured to grab and hold at least one flat ceramic product, in particular a group of flat ceramic products.

7. The loading/unloading system according to claim 1, and comprising:
a first storage area comprising a first plurality of loaded support structures, each comprising one said support structure and a plurality of flat ceramic products stacked on top of one another on the respective said support plane;
a second storage area comprising a second plurality of unloaded support structures, each comprising one said support structure and without a plurality of flat ceramic products stacked on top of one another;
the control unit being configured to operate: said at least one pick-up vehicle so as to pick up and transport at least one loaded support structure and/or at least one unloaded support structure between said loading/unloading device and said first storage area and/or between said loading/unloading device and said second storage area.

8. A loading/unloading system for flat ceramic products comprising at least one loading/unloading assembly for flat ceramic products, the loading/unloading assembly in turn comprises:
a conveying unit, which is configured to convey a plurality of flat ceramic products;
at least one loading/unloading device for flat ceramic products, which has a bottom and is configured to receive a support structure;
the support structure is configured to be capable of being picked up by a pick-up apparatus and comprises at least one support plane, which is configured to support a plurality of flat ceramic products stacked on top of one another; and
at least one pick-up device to pick up and transfer at least one flat ceramic product from said conveying unit to said support structure and/or vice versa;
the loading/unloading device being configured to move at least said support structure between a first position at a first height from said bottom and at least one second position at a second height from said bottom, said second height (being eater than the first height, and comprises a bearing device, which is configured to bear at least said support structure, a moving device to move said bearing device between the first position and the second position, and a further bearing device;
said moving device comprising at least one guide device to guide said bearing device at least between said first position and said second position;
said guide device defining a first path, along which said bearing device remains at least partially facing and in contact with a lower surface of said support plane so as to move at least said support structure while shifting from said first position to said second position and/or vice versa; and a second path, alone which said bearing device moves from said first position to said second position and/or vice versa; the first path and the second path being separated from one another and not intersecting one another;
the loading/unloading system further comprises:
at least one pick-up vehicle, which comprises said pick-up apparatus, which is at least vertically movable and is configured to support at least said support structure and to transfer at least said support structure to said loading/unloading device so that said support structure rests on said bearing device or on said further bearing device; and
a control unit, which is configured to operate:
said at least one pick-up vehicle so as to pick up and transport at least said support structure from and/or to said loading/unloading device;
said pick-up device so as to pick-up and transfer at least one flat ceramic product between said conveying unit and said loading/unloading device; and
said loading/unloading device between said first position and said second position
wherein:
the loading/unloading device is configured to move a loaded support structure between said first position and said second position;
said control unit is configured to control said at least one pick-up vehicle, said pick-up device and said loading/unloading device in such a way that:
when the pick-up vehicle transfers at least one first loaded support structure to said loading/unloading device so that it rests on said bearing device or on said further bearing device,
said pick-up device picks up and transfers said flat ceramic products stacked on top of one another on said support plane of said first loaded support structure towards said conveying unit so as to obtain a first unloaded support structure; said at least one pick-up vehicle transports a further loaded support structure towards said loading/unloading device and places it resting on said bearing device in the second position; said at least one pick-up vehicle picks up said first unloaded support structure; and said loading/unloading device, in particular said moving device, moves said further loaded support structure from said second position to said first position;

when the pick-up vehicle transfers at least one second unloaded support structure to said loading/unloading device so that it rests on said further bearing device in the rust position; said pick-up device picks up and transfers a plurality of flat ceramic products from said conveying unit to said support plane of said second unloaded support structure stacked on top of one another so as to obtain a second loaded support structure; said loading/unloading device moves said second loaded support structure from said first position to said second position, said at least one pick-up vehicle picks up a further unloaded support structure from said third storage area, transports it towards said loading/unloading device and places it resting on said further bearing device in the rust position; and said at least one pick-up vehicle picks up said second loaded support structure.

\* \* \* \* \*